United States Patent
Edlinger et al.

(10) Patent No.: US 10,408,403 B2
(45) Date of Patent: Sep. 10, 2019

(54) HEADLAMP FOR VEHICLES HAVING AT LEAST ONE LASER LIGHT SOURCE

(71) Applicant: ZKW Group GmbH, Wieselburg (AT)

(72) Inventors: Erik Edlinger, Vienna (AT); Emanuel Weber, Baden (AT)

(73) Assignee: ZKW GROUP GMBH, Wieselburg (AT)

(*) Notice: Subject to any disclaimer, the term of this patent is extended or adjusted under 35 U.S.C. 154(b) by 333 days.

(21) Appl. No.: 15/523,602

(22) PCT Filed: Nov. 5, 2015

(86) PCT No.: PCT/AT2015/050281
§ 371 (c)(1),
(2) Date: May 1, 2017

(87) PCT Pub. No.: WO2016/070214
PCT Pub. Date: May 12, 2016

(65) Prior Publication Data
US 2017/0328532 A1  Nov. 16, 2017

(30) Foreign Application Priority Data
Nov. 7, 2014  (AT) .............................. A 50815/2014

(51) Int. Cl.
*F21S 41/16* (2018.01)
*G03B 21/20* (2006.01)
(Continued)

(52) U.S. Cl.
CPC ............. *F21S 41/14* (2018.01); *F21S 41/135* (2018.01); *F21S 41/16* (2018.01); *F21S 41/25* (2018.01);
(Continued)

(58) Field of Classification Search
CPC .. G03B 21/204; G03B 21/28; G03B 21/2073; G03B 21/2066; H04N 9/3167;
(Continued)

(56) References Cited

U.S. PATENT DOCUMENTS

| 2008/0055557 A1 | 3/2008 | Yavid et al. |
| 2010/0142046 A1 | 6/2010 | Gao |

(Continued)

FOREIGN PATENT DOCUMENTS

| DE | 102012112127 A1 | 6/2014 |
| DE | 102013103410 A1 | 10/2014 |

(Continued)

OTHER PUBLICATIONS

Office Action issued in Austrian application No. A 50815/2014, completed Sep. 10, 2015.
(Continued)

*Primary Examiner* — Ryan D Howard
(74) *Attorney, Agent, or Firm* — Eversheds Sutherland (US) LLP

(57) ABSTRACT

A headlamp for vehicles, in which the laser beam of at least one laser light source (1) is directed via a beam deflection means (7) towards at least one light conversion means (8) in a scanning manner, which at least one light conversion means comprises a phosphor for converting light, and having a projection system (10) for projecting the light image (9) generated at the light conversion means onto the roadway (11), characterized in that at least one electro-optical modulator (4) is arranged in the beam path of the at least one laser light source (1), which at least one electro-optical modulator is controlled by a control unit (12) and lies before the light conversion means (8) in the beam path and affects (Continued)

Figure 1:
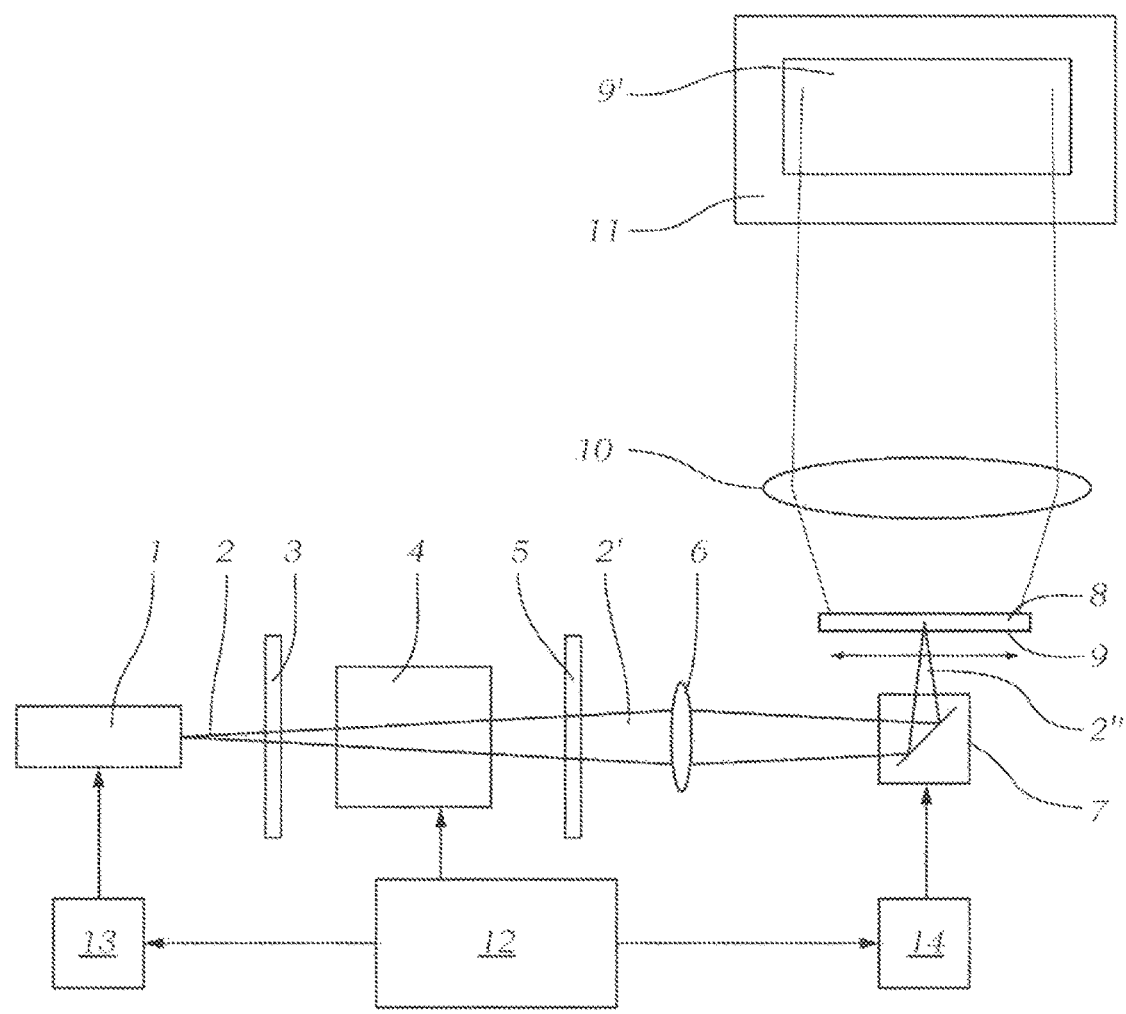

the polarization of the light, wherein a polarization element (3, 5, 17) is arranged at least after the modulator in the beam path.

9 Claims, 4 Drawing Sheets

(51) Int. Cl.
| | |
|---|---|
| *H04N 9/31* | (2006.01) |
| *F21S 41/14* | (2018.01) |
| *F21S 41/135* | (2018.01) |
| *F21S 41/25* | (2018.01) |
| *F21S 41/675* | (2018.01) |
| *F21S 41/20* | (2018.01) |
| *F21S 41/32* | (2018.01) |
| *F21V 9/30* | (2018.01) |
| *G02F 1/03* | (2006.01) |
| *F21Y 115/30* | (2016.01) |

(52) U.S. Cl.
CPC ............. *F21S 41/285* (2018.01); *F21S 41/32* (2018.01); *F21S 41/675* (2018.01); *F21V 9/30* (2018.02); *G02F 1/03* (2013.01); *G03B 21/204* (2013.01); *H04N 9/3158* (2013.01); *F21Y 2115/30* (2016.08)

(58) Field of Classification Search
CPC ..... H04N 9/3158; H04N 9/3161; F21S 41/14; F21S 41/16; F21S 41/675; F21S 41/25; F21V 9/30
See application file for complete search history.

(56) References Cited

U.S. PATENT DOCUMENTS

| | | |
|---|---|---|
| 2014/0029282 A1 | 1/2014 | Ravier et al. |
| 2014/0254188 A1 | 9/2014 | Masuda et al. |
| 2015/0369437 A1 | 12/2015 | Reinprecht et al. |

FOREIGN PATENT DOCUMENTS

| | | |
|---|---|---|
| EP | 0291475 A2 | 11/1988 |
| EP | 2063170 A2 | 5/2009 |
| WO | 2013/094222 A1 | 6/2013 |

OTHER PUBLICATIONS

International Search Report and Written Opinion for PCT/AT2015/050281, dated Feb. 12, 2016.

HEADLAMP FOR VEHICLES HAVING AT LEAST ONE LASER LIGHT SOURCE

The invention relates to a headlamp for vehicles, in which the laser beam of at least one laser light source is directed via a beam deflection means towards at least one light conversion means in a scanning manner, which at least one light conversion means comprises a phosphor for converting light, and having a projection system for projecting the light image generated at the light conversion means onto the roadway.

The use of laser light sources in motor vehicles is becoming increasingly important, since in particular laser diodes enable more flexible and more efficient solutions, whereby, in addition to new possibilities with regard to functionality, the luminance of the light bundle and also the light output of the headlamp can also be significantly increased.

In many known solutions, however, no direct laser beam is emitted, so as to avoid endangering humans and other living beings as a result of the extremely bundled light beam of high intensity. The laser beam is rather directed towards an interposed converter, which contains a luminescence conversion material, or "phosphor" for short, and is converted by this light conversion means from, for example, blue light into preferably "white" light, in particular such that, when superimposed with the scattered laser radiation, a legally compliant white light impression is created.

Document EP 2 063 170 A2 discloses a headlamp for motor vehicles in which, in order to illuminate the roadway by means of a glare-free adaptive main beam, specific areas can be left out depending on other road users and/or depending on ambient parameters, such as speed; town/open land/motorway, weather, dusk, etc. The beam of a laser is directed towards an illumination surface via a micromirror movable in two spatial directions, which illumination surface contains a phosphor for converting the laser light into preferably white light. The light image of the illumination surface is projected onto the roadway by means of a lens.

A specific problem can be the often somewhat sluggish behaviour of the laser light sources with regard to the actuation thereof, in particular the switching on and off. This sluggishness, which can be attributed in the first instance to the need to control relatively large currents, can lead to safety problems, for example if an emergency shutdown is necessary, or a masking process, for example so as not to dazzle other road users, might not be able to be initiated within the necessary short space of time.

One object of the invention lies in mitigating or overcoming these problems.

This object is achieved with a headlamp of the type described in the introduction, in which, in accordance with the invention, at least one electro-optical modulator is arranged in the beam path of the at least one laser light source, which at least one electro-optical modulator is controlled by a control unit and lies before the light conversion means in the beam path and affects the polarisation of the light, wherein a polarisation element is arranged at least after the modulator in the beam path.

It is expedient here if the control unit is provided to control the electro-optical modulator and to control the beam deflection means.

A proven and economical variant is characterised in that the polarising element is a polarisation filter.

If the polarisation element is a polarising beam splitter the advantage is provided that, in contrast to a polarisation filter, no laser radiation is absorbed.

It is advantageous if the electro-optical modulator is formed as a Pockels cell, since a Pockels cell in fact can be connected purely capacitively, without active power uptake.

In a recommended variant it is provided that the at least one laser light source comprises a laser diode, which is accommodated together with an electro-optical modulator in a joint housing. Thanks to the spatial vicinity of the optically active elements, any required switching voltages can be kept low.

In a variant, it can be provided that two or more electro-optical modulators are arranged in succession in the beam path of the at least one laser light source. This is advantageous in particular if a pulse-width modulation or an RGB laser system is to be used.

An expedient development is characterised in that a focussing optics for the laser beam is arranged downstream of the electro-optical modulator. The properties of the laser light are thus prevented from changing before said light passes through the electro-optical modulator, such that the electro-optical modulation can be performed precisely and efficiently. Here, it should be noted that for example any lens changes the edge polarisation of the light by means of the spherical aberrations.

If the control unit is designed to control the laser light source and the electro-optical modulator synchronously and to activate the electro-optical modulator when the laser light source is switched off so as to block the laser beam, steeper switching flanks are obtained, and consequently there is no blurred progression of the image for example in areas of the light image to be masked out.

Figure 2:
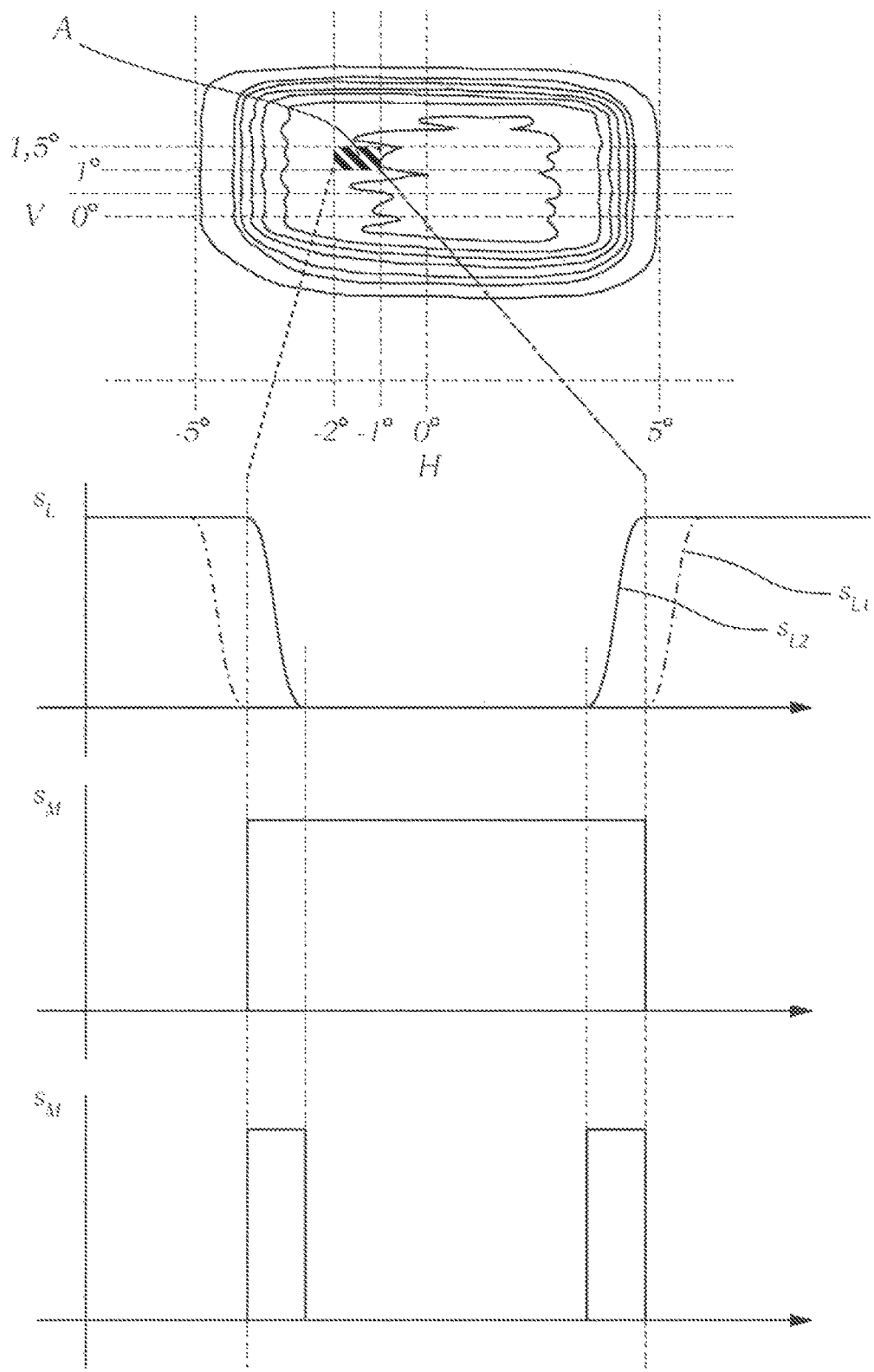
Figure 3:
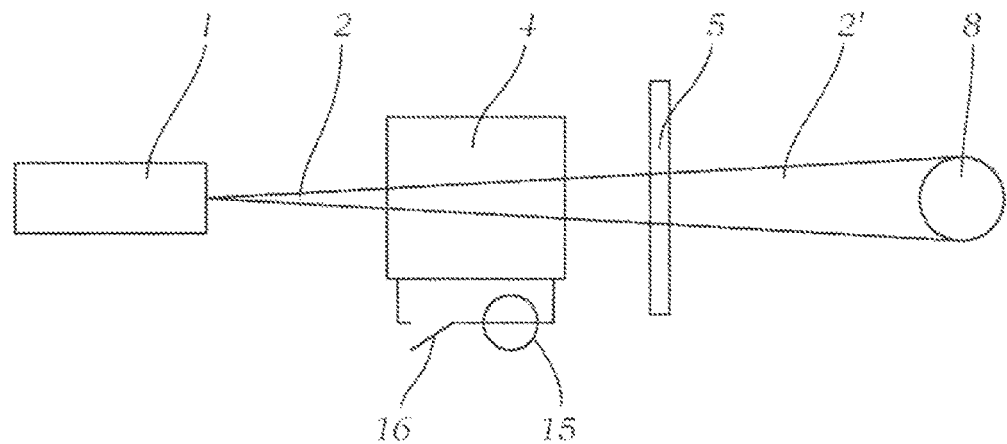
Figure 4:
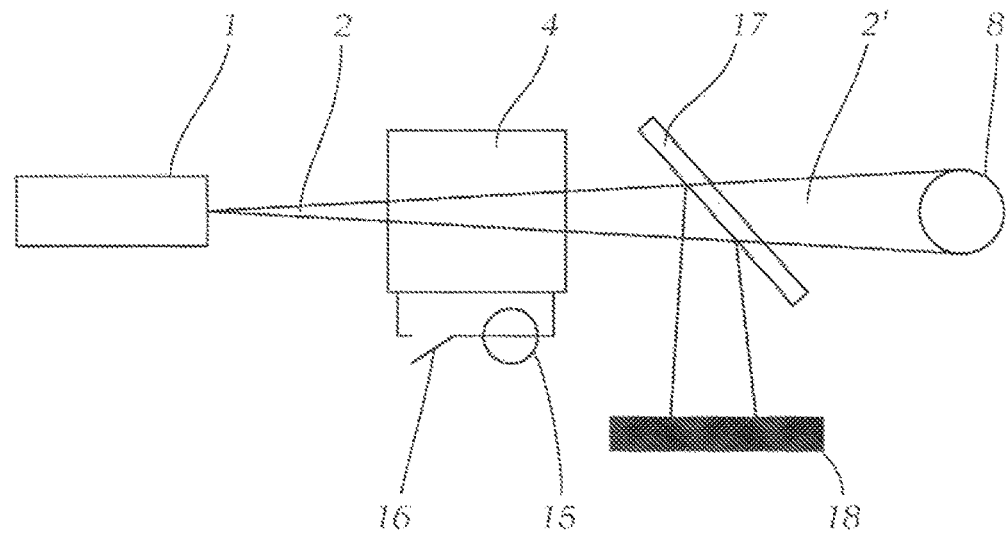
Figure 5:
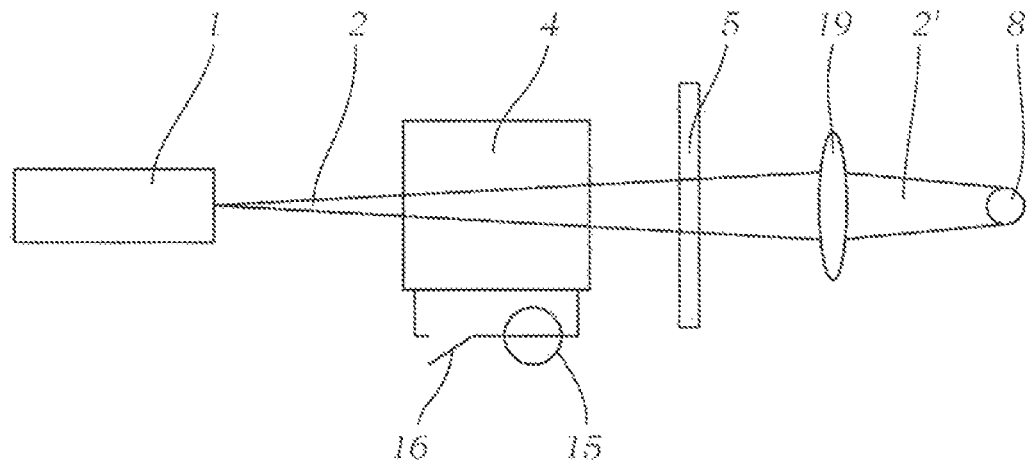
Figure 6:
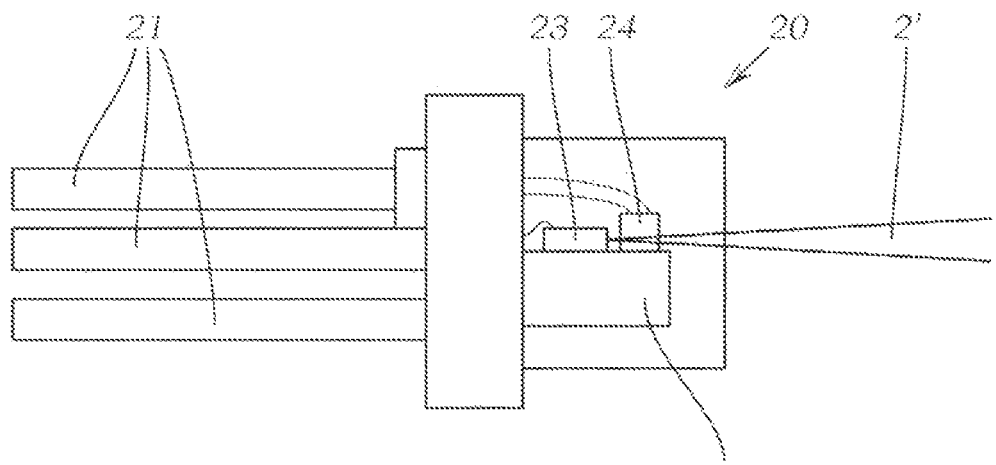

The invention together with further advantages will be explained in greater detail hereinafter on the basis of exemplary embodiments, which are illustrated in the drawing, in which FIG. 1 shows the components of a headlamp essential to the invention and the relationship therebetween in a schematic illustration in an exemplary embodiment, FIG. 2 shows, in a graph, an exemplary light image and the course over time of control voltages of the laser light source or the modulator, FIG. 3 schematically shows the beam course with a polarisation filter arranged downstream of the modulator, FIG. 4 shows, in an illustration similar to FIG. 3, the use of a polarising beam splitter, FIG. 5 shows, in an illustration similar to FIGS. 3 and 4, a focussing optics arranged downstream of the polarisation element, and FIG. 6 shows a laser diode, which is combined together with an electro-optical modulator in a joint housing.

FIG. 1 schematically shows a headlamp with the parts essential to the invention and also the beam path of this headlamp, wherein it should be clear that a motor vehicle headlamp also contains many other parts, which allow appropriate use thereof in a motor vehicle, such as in particular a passenger car or motorbike. In terms of light, the starting point of the headlamp is a laser light source 1, which outputs a laser beam 2. This laser beam 2 then passes through a first polarisation filter 3, then an electro-optical modulator 4 formed for example as a Pockels cell, and a second polarisation filter 5. The laser beam 2' exiting therefrom is then focussed with the aid of a focussing optics 6 and is guided via a beam deflection means 7 formed for example as a micromirror to a light conversion means 8, which, as is known, comprises a phosphor for light conversion. The focussing optics can be a lens or a lens system and also a reflector system with one or more reflectors, wherein a combination of lenses and reflectors is possible. The polarisation filters 3 and 5 expediently have the same optical properties. With regard to the use of the focussing optics 6, it should be noted that such an optics does not necessarily have to be provided, and a lens for the desired influencing of the laser beam, for example also for the widening thereof, could be provided quite generally.

The laser beam 2" deflected by the micromirror 7 generates a light image 9, in a scanning manner, on the phosphor of the light conversion means 8, and this light image 9 is projected with the aid of a projection system 10 of the headlamp, in the present case a lens, onto the roadway 11 as light image 9'. The term "roadway" is used here for simplified representation, because of course it is dependent on the local conditions as to whether the light image 9' actually is located on the roadway or also extends therebeyond. In principle, the image 9' corresponds to a projection onto a vertical surface, and the "roadway" is also illustrated here as such, in accordance with the relevant standards which relate to motor vehicle illumination technology.

A control unit 12 is also provided, which in turn acts on a laser controller 13 and also on a mirror controller 14. Here, the laser controller 13 is able to switch the laser light source 1 on and off and is also able to regulate or control the laser intensity.

The control unit also serves to supply power and to monitor the laser emission or for example for temperature control and is also designed to modulate the intensity of the emitted laser beam. The tem "modulate" is understood in conjunction with the present invention to mean that the intensity of the laser light source can be changed, whether continuously or in a pulsed manner, in the sense of a switching on and off. It is essential that the light output can be dynamically changed analogously, depending on the angular position of the micromirror of the beam deflection means 7. In addition, there is also the possibility to switch the laser light on and off for a certain period of time so as not to illuminate or so as to mask out defined points. An example of a dynamic control concept for generating an image by a scanning laser beam is described for example in the Austrian patent application A 50454/2013 in the name of the applicant, dated 16 Jul. 2013. The laser light source in practice often contains a number of laser diodes, for example six, for example each being 1 watt, so as to achieve the desired output or the required luminous flux.

The laser light source 1 for example outputs blue light or UV radiation and if needs be has a collimator optics and a focussing optics, wherein the design of the optics is dependent, inter alia, on the type, number, and spatial placement of the used laser diodes, on the necessary beam quality, and on the desired laser spot size at the light conversion means.

The mirror controller 14 is in turn used to set the micromirror of the beam deflection means 7 in vibration, for example in two directions orthogonal to one another, the vibrations being of constant, but in many cases different frequency in the x-direction and y-direction, wherein these vibrations can correspond in particular to mechanical inherent frequencies of the micromirror in the corresponding axes. It should be noted, however, that instead of a micromirror, other beam deflection means can also be used, for example movable prisms. The control unit 12 additionally controls the electro-optical modulator 4, wherein in the case of a Pockets cell a relatively high voltage is required in an order of several 100 V so as to induce the desired rotation of the polarisation plane. The required control voltage is dependent however on the desired rotation of the polarisation plane and on the size of the used crystal.

The smaller is the crystal, the lower can be the control voltage.

The function of the headlamp according to the invention having the electro-optical modulator 4 is explained in greater detail with reference to FIG. 2, which shows an exemplary maskout scenario. Here, a specific momentary luminance distribution of the light image 9 or light image 9' scanned/projected towards the phosphor of the light conversion means 8 or towards the roadway 11 is illustrated at the top in FIG. 2. Exemplary angle values are plotted in the x-direction H (horizontal) and y-direction (vertical). A region A, which is to be masked out, has been highlighted by hatching.

A course over time of the control signal $^sL$ of the laser light source 1, and therebelow two different courses over time of a control signal $^sM$ for the electro-optical modulator 4 are shown below the luminance distribution.

The controller of the laser light source 1 and the controller of the electro-optical modulator 4 work in a synchronised manner. By way of example, a laser control signal $^sL$ for switching off the laser light source 1 and a control signal $^sM$ for the modulator 4 are output by the joint control unit 12 on account of a mask-out scenario in a specific area in the image 9 or 9', which has just been scanned over by the laser spot of the laser beam, and are intended to bring said modulator into a blocking state or weakening state—always under consideration of at least one polariser located in the beam path. It is thus ensured that the beam path of the laser light source 1 is immediately "blocked" and that no blurred light image occurs on account of the slow control of the laser.

As soon as the region is to be illuminated again, the modulator should be switched to active again within the period of time required by the electronic controller to switch completely back to 100%.

Here, it should be noted that the cited example for a complete ON/OFF state of course can also be transferred to a scenario in which for example 100% brightness is to be switched merely to 50%, or more generally a dimming is to take place, in which case sharp mask-out edges likewise are desired.

FIG. 2 initially shows in a more detailed manner the conventional electrical control of the laser light source 1 from 100% to 0% and then back to 100%. The dotted-and-dashed "switch-on curve" $^sL1$ shows the usual switching moment, which is set such that the laser light source 1 is reliably switched off in the time of the area to be masked out, the curve $^sL2$ however shows the upstream switch-on moment in accordance with a preferred embodiment of the invention.

If the electro-optical modulator 4 is controlled from "inactive" to "active", the polarisation is rotated and consequently the beam is blocked (or weakened) on account of the polarisation element. The electro-optical modulator 4 remains active during the entire time of the area to be masked out (here horizontally from −2° to −1°. A further advantage of the combination of a controller on the one hand for the laser light source and on the other hand the electrooptical modulator lies in the redundancy of this controller, since the laser beam can still be masked out if one controller fails. The laser controller 13 advantageously receives the signal already before the end of the mask-out scenario, so as to switch back to 100% (curve $^sL2$), particularly preferably precisely by exactly the time that is required to pass from 0% to 100%. The time in which the controller of the laser light source 1 has already unnecessarily completed the switchover process although the area to be masked out has not even been passed through yet is thus minimised. This example also applies analogously to those situations in which, as already also mentioned above, the intensity is to be reduced only in part. Here, the modulator 4 will induce a rotation of the polarisation only in part, and thus will induce only a partial blocking of the laser beam.

The lowermost graph in FIG. 2 shows the preferred control of the electro-optical modulator 4. Here, the modulator 4 is actively switched only during the time in which the electronic laser controller 13 performs a "switching process". The system can thus be used in the most efficient way possible, since the modulator 4 here in combination with the electrical controller of the laser, in contrast to the system having merely optical modulation or merely electrical modulation of the laser light source 1, does not have to be switched to active during the entire maskout period, and the laser beam also does not additionally have to be absorbed or deflected via a filter. Thus, losses occur only during the times in which a sharp mask-out edge is desired and are then still dependent only on the nature of the switching flanks of the electrical controller of the laser light source 1.

Since a specific embodiment and also a particular operating principle of such an embodiment according to the invention have been described above, further variants of the invention will be briefly described hereinafter schematically, wherein this description is in no way exhaustive, and rather a person skilled in the art will find other expedient solutions within the scope of the protection afforded by the claims.

FIG. 3 schematically shows a laser light source 1, from which a laser beam 2 emanates and passes through the electro-optical modulator already described above. This modulator 4 can be a Pockels cell for example, to which a DC voltage 15 can be applied with the aid of a controlled switch 16. The functions of the controlled switch 16 and of the DC voltage 15 are usually integrated in a control unit, for example the control unit 12 of FIG. 1. The laser beam exiting from the electro-optical modulator 4 passes through a polarisation filter 5 and then passes as laser beam 2' to the light conversion means 8 described in detail further above. The further parts of the headlamp are not described in greater detail in this drawing or also in the following drawings, since they were already the subject of the explanations above. In contrast to the embodiment according to FIG. 1, merely a single polarisation filter 5 is thus provided here.

In the embodiment according to FIG. 4, which for the rest corresponds to that according to FIG. 3, a polarising beam splitter 17 is provided instead of the polarisation filter 5, and a polarised laser beam 2' runs from said polarising beam splitter to the light conversion means 8. The reflected and unrequired part of the laser radiation is directed towards an absorber 18, the purpose of which is to reliably capture this part of the laser radiation so that it does not lead to disruptions or damage.

With regard to the polariser, which in principle also could be a wire grid polariser, it should be noted that a laser light source generally emits coherent light. In addition, in the case of most laser light sources, the emitted light is polarised linearly, either horizontally or vertically. Such a laser which emits linearly polarised light is advantageously used for the invention.

The first polarisation filter is advantageously designed to allow to pass through it precisely the polarised light which is emitted by the laser light source. Since, on account of manufacturing tolerances, it must be anticipated that light which is not perfectly horizontally or vertically linearly polarised exits from the laser light source and, as already described, the system then would not be so efficient, it is advantageous to provide said first polarisation filter.

The light emitted by the laser light source by way of example is now horizontally linearly polarised. If the electro-optical modulator in the active state now rotates the horizontally linearly polarised light to a vertically polarised light, this does not induce any "blocking" of the laser light, and merely the polarisation changes. Consequently, for an actual blocking of the laser beam, a polarisation filter must be arranged downstream of the electro-optical modulator. This downstream polarisation filter must then of course be designed to also allow to pass through it light which is emitted by the laser light source, in the present example horizontally linearly polarised light. All other light is absorbed or reflected, depending on the type of used polarising element.

In the embodiment according to FIG. 5, which in principle corresponds to that according to FIG. 3, the focussing optics 19 generally necessary for the laser beam, which optics is illustrated here as an individual lens for reasons of simplicity, is arranged downstream of the electro-optical modulator 4, and in this case also downstream of the polarisation filter 5. As already mentioned further above, the properties of the laser light are thus prevented from changing before said laser light passes through the electro-optical modulator, and the electro-optical modulation can be performed precisely and efficiently.

At this juncture, it should be noted that in the embodiments according to FIGS. 3 to 5, the laser beam passing through the modulator 4 and a polarisation element 5, 17, which laser beam according to FIG. 5 is also focussed by a focussing optics 19, is incident on the light conversion means 8. In most embodiments, however, as is shown in FIG. 1, a beam deflection means 7 is also disposed before the light conversion means 8, as in FIG. 1. A beam deflection means 7 of this type can be provided, but does not necessarily have to be part of a headlamp. The invention can thus also be used in headlamps in the broadest sense which do not function in accordance with the principle of a scanning laser beam. On the other hand, as has already been mentioned above, the invention can also be used for headlamps which get by without a light conversion means and for example use three laser beams, which together give the desired colour impression.

Reference is also made to FIG. 6, which shows a commercially available TO housing 20 with connections 21, wherein a laser diode 23 and, optically downstream thereof, a Pockels cell 24 are arranged in the housing 20 on a carrier 22. The exiting laser beam 2' can then still be focussed for example and can be directed in a scanning manner towards a light conversion means via a micromirror, as is illustrated in FIG. 1.

The electro-optical modulator 4 according to the invention can also be used to dim a laser beam if the modulator 4 is controlled in accordance with a pulse-width modulation. A dimming can also be achieved by varying the voltage applied to the modulator 4, for example a Pockels cell, whereby a corresponding weaker or stronger rotation of the polarisation plane is caused. It is also possible to arrange and control a plurality of electro-optical modulators in succession in the beam path, such that for example a first modulator causes a rotation which leads to a dimming or weakening of the laser light of 25% and a further modulator is controlled such that it causes a weakening of 75%. In this way, weakening stages of 0, 25, 75 and 100% could be attained with two electro-optical modulators 4 arranged in succession, and no variable control circuit is required for the modulators, but instead merely fixed voltages for switching on and off or activation and deactivation. In this embodiment, a polarisation filter does not have to be arranged downstream of each modulator, and it is also sufficient to use a single joint polarisation filter in the beam path after the plurality of electro-optical modulators.

Lastly, it should be mentioned that it would also appear possible to use one of the described arrangements "in reverse". This means that the electro-optical modulators can be designed such that, in the state switched to active, they are permeable for the laser beam and, in the inactive state, they absorb/reflect the laser beam. However, in this case the modulator, for example a crystal, on average remains switched on longer (actively switched) than switched off (inactive), and the losses in the modulator are higher due to the longer-lasting control. This is also a reason why both polarisation filters should have the same optical properties and the system should be used such that in the active state of the modulator the beam path is blocked by the downstream polarisation filter.

LIST OF REFERENCE SIGNS 1 laser light source
2, 2', 2" laser beam
3 polarisation filter, first
4 electro-optical modulator
5 polarisation filter, second
6 focussing optics
7 beam deflection means
8 light conversion means
9 light image
9' light image
10 projection system
11 roadway
12 control unit
13 laser controller
14 mirror controller
15 DC voltage source
16 switch, controlled
17 polarising beam splitter
18 absorber
19 focussing optics
20 TO housing
21 connections
22 carrier
23 laser diode
24 Pockels cell

The invention claimed is:

1. A headlamp for vehicles, comprising:
at least one laser light source (1) configured to produce a laser beam;
a beam deflection means (7);
at least one light conversion means (8), which comprise a phosphor for converting light, and which has a projection system (10);
at least one electro-optical modulator (4) which is arranged in the beam path of the at least one laser light source (1); and
a polarisation element (3, 5, 17) which is arranged at least after the at least one electro-optical modulator (4) in the beam path
wherein the beam deflecting means is configured to direct the laser beam of the at least one laser light source (1) towards the at least one light conversion means (8) in a scanning manner and the projection system (10) is configured to project a light image (9) generated at the light conversion means onto a roadway (11), and
wherein the at least one electro-optical modulator (4) is controlled by a control unit (12) and lies before the light conversion means (8) in the beam path and affects the polarisation of the light.

2. The headlamp of claim 1, wherein the control unit (12) is provided to control the electro-optical modulator (4) and a controller (14) of the beam deflection means (7).

3. The headlamp of claim 1, wherein the polarising element (3, 5) is a polarisation filter.

4. The headlamp of claim 1, wherein the polarising element (17) is a polarising beam splitter.

5. The headlamp of claim 1, wherein the electro-optical modulator (4) is formed as a Pockels cell.

6. The headlamp of claim 1, wherein the at least one laser light source (1) comprises a laser diode (23), which is accommodated together with an electro-optical modulator (24) in a joint housing (20).

7. The headlamp of claim 1, wherein two or more electro-optical modulators are arranged in succession in the beam path of the at least one laser light source (1).

8. The headlamp of claim 1, wherein a focussing optics (6) for the laser beam (2') is arranged downstream of the electro-optical modulator (4).

9. The headlamp of claim 1, wherein the control unit (12) is designed to control the laser light source (1) and the electro-optical modulator (4) synchronously and to activate the electro-optical modulator when the laser light source is switched off so as to block the laser beam.

* * * * *